United States Patent
Liu et al.

(10) Patent No.: US 11,397,306 B2
(45) Date of Patent: Jul. 26, 2022

(54) VEHICULAR CAMERA WITH TEMPERATURE INVARIANT LENS SPACERS

(71) Applicant: Magna Electronics Inc., Auburn Hills, MI (US)

(72) Inventors: Zhongyao Liu, Troy, MI (US); Steven V. Byrne, Goodrich, MI (US); Yuesheng Lu, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 254 days.

(21) Appl. No.: 16/525,666

(22) Filed: Jul. 30, 2019

(65) Prior Publication Data

US 2020/0033549 A1    Jan. 30, 2020

Related U.S. Application Data

(60) Provisional application No. 62/711,655, filed on Jul. 30, 2018.

(51) Int. Cl.
*G02B 7/02*       (2021.01)
*G03B 13/32*    (2021.01)

(52) U.S. Cl.
CPC .............. *G02B 7/028* (2013.01); *G03B 13/32* (2013.01)

(58) Field of Classification Search
CPC .......... G02B 7/02; G02B 7/028; G02B 7/021; G02B 7/022; G02B 7/026; G03B 13/32; G03B 17/55; H04N 5/225; H04N 5/2252; H04N 5/2253; H04N 5/2254

USPC ....... 359/820, 819, 811, 703, 704, 503, 506; 396/529, 526, 530, 97, 98
See application file for complete search history.

(56) References Cited

U.S. PATENT DOCUMENTS

| | | |
|---|---|---|
| 5,412,510 A | 5/1995 | Iizuka et al. |
| 5,550,677 A | 8/1996 | Schofield et al. |
| 5,670,935 A | 9/1997 | Schofield et al. |
| 5,949,331 A | 9/1999 | Schofield et al. |
| 5,978,017 A | 11/1999 | Tino |
| 6,151,065 A | 11/2000 | Steed et al. |
| 7,595,943 B2 | 9/2009 | Yuan |
| 7,965,336 B2 | 6/2011 | Bingle et al. |
| 8,542,451 B2 | 9/2013 | Lu et al. |
| 8,994,878 B2 | 3/2015 | Byrne et al. |
| 9,077,098 B2 | 7/2015 | Latunski |
| 9,277,104 B2 | 3/2016 | Sesti et al. |
| 9,621,769 B2 | 4/2017 | Mai et al. |

(Continued)

*Primary Examiner* — Jie Lei
(74) *Attorney, Agent, or Firm* — Honigman LLP

(57) ABSTRACT

A vehicular camera includes a circuit board having an imager disposed at a first side of the circuit board. A lens barrel includes a lens assembly having a plurality of lens elements spaced apart along the lens barrel by respective lens spacers, each lens spacer formed of a material having a coefficient of thermal expansion (CTE) of 10 ppm/° C. or less. The circuit board is positioned at the lens holder, and the lens barrel is positioned at a lens holder so as to optically align the lens and the imager. The lens barrel is formed of a material having a CTE that matches within ten percent of the CTE of the material that forms the lens holder, with the CTEs of the lens barrel and lens holder materials being greater than the CTE of the material of the lens spacers.

13 Claims, 4 Drawing Sheets

(56) References Cited

U.S. PATENT DOCUMENTS

| | | | |
|---|---|---|---|
| 10,207,646 B2 | 2/2019 | Oh | |
| 10,274,812 B1 | 4/2019 | Chen | |
| 2003/0029917 A1* | 2/2003 | Hennick | G06K 13/08 235/454 |
| 2003/0090569 A1 | 5/2003 | Poechmueller | |
| 2007/0098400 A1* | 5/2007 | Chen | H04N 5/2254 396/529 |
| 2007/0146908 A1 | 6/2007 | Li | |
| 2009/0244361 A1 | 10/2009 | Gebauer et al. | |
| 2011/0025850 A1 | 2/2011 | Maekawa et al. | |
| 2011/0298925 A1 | 12/2011 | Inoue et al. | |
| 2012/0019940 A1 | 1/2012 | Lu et al. | |
| 2013/0183499 A1 | 7/2013 | Kido et al. | |
| 2013/0242099 A1 | 9/2013 | Sauer et al. | |
| 2014/0298642 A1 | 10/2014 | Sesti et al. | |
| 2014/0373345 A1 | 12/2014 | Steigerwald | |
| 2015/0015713 A1 | 1/2015 | Wang et al. | |
| 2015/0029337 A1 | 1/2015 | Uchiyama et al. | |
| 2015/0124098 A1 | 5/2015 | Winden et al. | |
| 2015/0222795 A1 | 8/2015 | Sauer et al. | |
| 2015/0327398 A1 | 11/2015 | Achenbach et al. | |
| 2015/0379361 A1 | 12/2015 | Boulanger | |
| 2016/0037028 A1 | 2/2016 | Biemer | |
| 2016/0191863 A1 | 6/2016 | Minikey, Jr. et al. | |
| 2016/0202443 A1* | 7/2016 | Knutsson | H04N 5/2257 348/148 |
| 2016/0243987 A1 | 8/2016 | Kendall | |
| 2016/0268716 A1 | 9/2016 | Conger et al. | |
| 2016/0286103 A1 | 9/2016 | Van Dan Elzen | |
| 2017/0036600 A1 | 2/2017 | Whitehead et al. | |
| 2017/0054881 A1 | 2/2017 | Conger et al. | |
| 2017/0126938 A1 | 5/2017 | Newiger | |
| 2017/0133811 A1 | 5/2017 | Conger et al. | |
| 2017/0201661 A1 | 7/2017 | Conger | |
| 2017/0280034 A1 | 9/2017 | Hess et al. | |
| 2017/0295306 A1 | 10/2017 | Mleczko | |
| 2017/0302829 A1 | 10/2017 | Mleczko et al. | |
| 2018/0027151 A1 | 1/2018 | Kazama et al. | |
| 2018/0033741 A1 | 2/2018 | Dubey et al. | |
| 2018/0098033 A1 | 4/2018 | Mleczko et al. | |
| 2019/0121051 A1 | 4/2019 | Byrne et al. | |
| 2019/0124238 A1 | 4/2019 | Byrne et al. | |
| 2019/0124243 A1 | 4/2019 | Mleczko et al. | |
| 2019/0166289 A1 | 5/2019 | Knutsson et al. | |
| 2019/0306966 A1 | 10/2019 | Byrne et al. | |
| 2020/0001787 A1 | 1/2020 | Lu et al. | |
| 2020/0412925 A1 | 12/2020 | Byrne et al. | |

* cited by examiner

VEHICULAR CAMERA WITH TEMPERATURE INVARIANT LENS SPACERS

CROSS REFERENCE TO RELATED APPLICATION

The present application claims the filing benefits of U.S. provisional application Ser. No. 62/711,655, filed Jul. 30, 2018, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties. Various cameras have been proposed for such imaging systems, including cameras of the types described in U.S. Pat. No. 7,965,336 and U.S. Publication No. US-2009-0244361, which are hereby incorporated herein by reference in their entireties.

SUMMARY OF THE INVENTION

The present invention provides a driver assistance system or vision system or imaging system for a vehicle that utilizes one or more cameras (preferably one or more CMOS cameras) to capture image data representative of images exterior of the vehicle, and provides a temperature invariant lens assembly (having very low CTE spacers) and providing a lens holder and lens barrel having similar CTEs. When the camera is disposed at the vehicle and exposed to a high or low temperature, lens optics do not vary significantly in their positions along the lens barrel relative to one another and any variation in the lens barrel itself is offset by a similar variation in the lens holder or camera housing.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
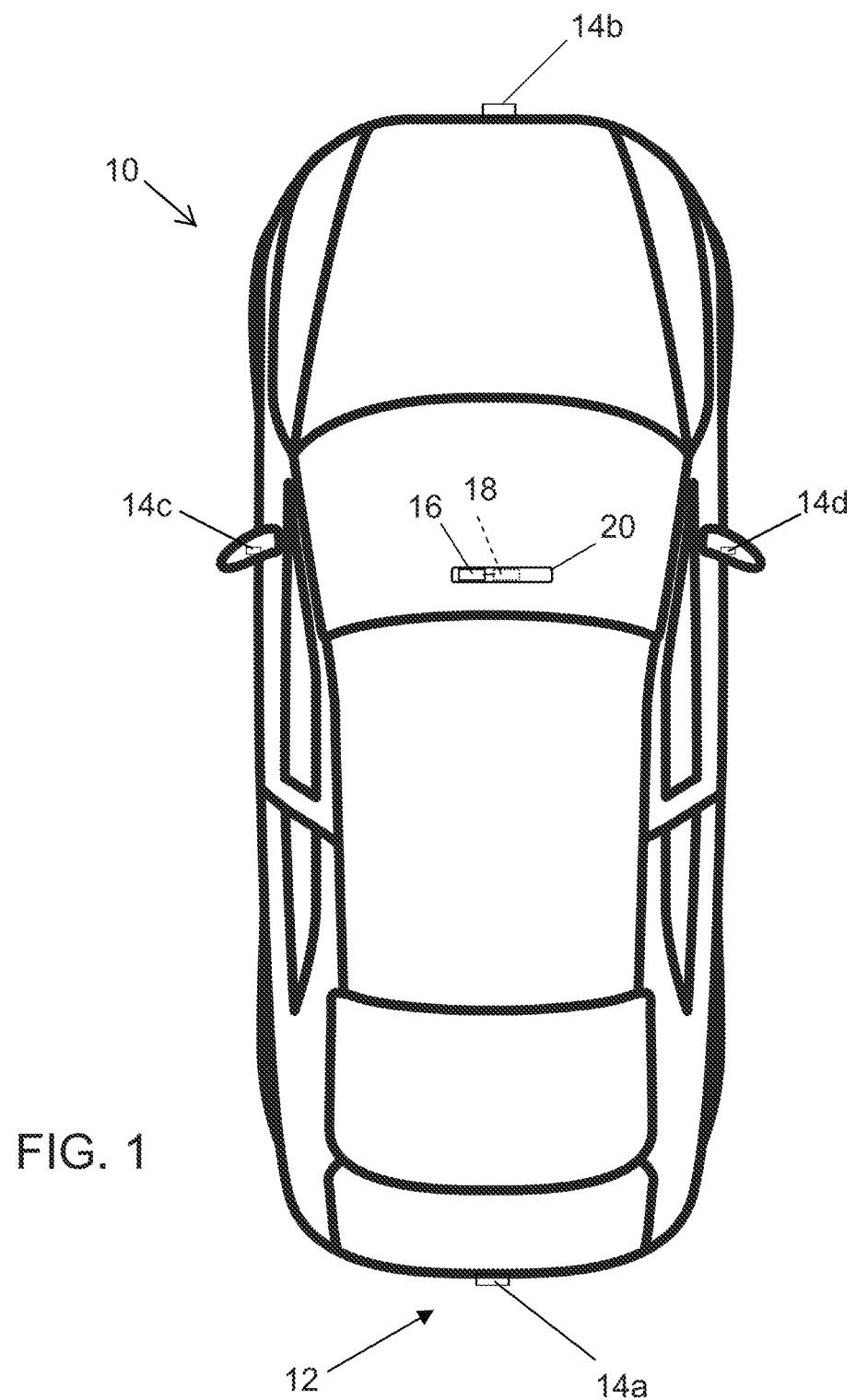
FIG. 1 is a plan view of a vehicle with a vision system that incorporates multiple cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14a (and the system may optionally include multiple exterior viewing imaging sensors or cameras, such as a forward viewing camera 14b at the front (or at the windshield) of the vehicle, and a sideward/rearward viewing camera 14c, 14d at respective sides of the vehicle), which captures images exterior of the vehicle, with the camera having a lens for focusing images at or onto an imaging array or imaging plane or imager or imaging device of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The control unit may comprise or may be part of an autonomous vehicle control system, whereby the cameras capture image data that is processed for use in autonomously controlling the vehicle. Autonomous vehicle cameras require very high levels of focus precision in all environments. Automotive cameras must maintain precise lens-to-imager relative position throughout the full range of operating temperatures. This is challenging because of the various camera assembly material CTEs (Coefficients of Thermal Expansion). The optical performance of the lens may also be a contributor. The lens-to-image sensor distance must be stable. The coefficient of thermal expansion for standard materials such as aluminum, zinc and magnesium may be too high for the required range of temperatures for automotive cameras, which may result in temperature-induced expansion/contraction of components, resulting in adjustment of the focus of the lens at the imager.

Simulations have been performed on the mechanical and optical design to predict changes as accurately as possible. The actual assembly will often still have a five or more microns lens-to-imager shift due to unforeseen behaviors with the components and optics. Further long-term control is often unachievable.

Figure 2:
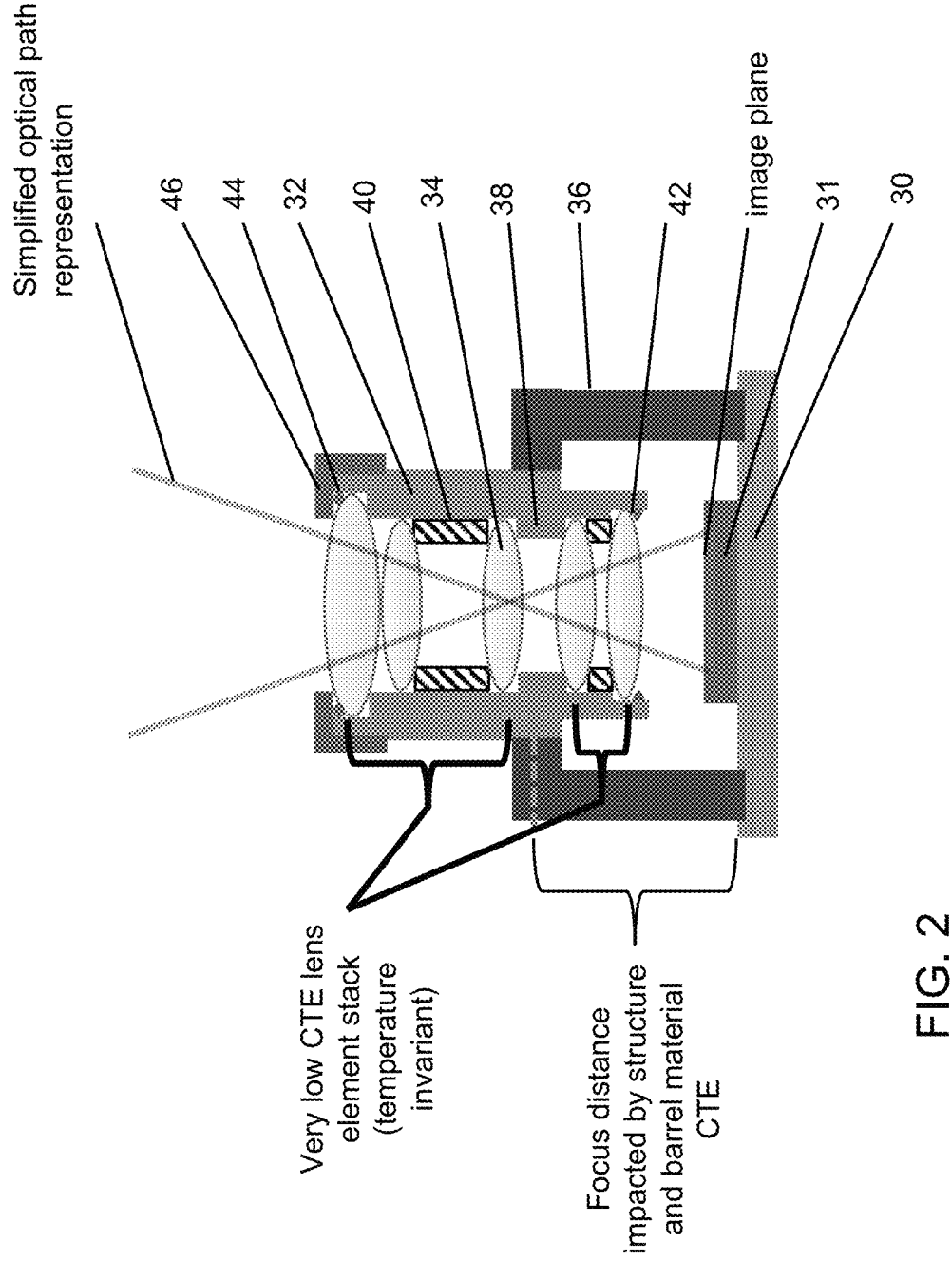
FIG. 2 is a side view diagram of a camera having an imager and a lens, with very low CTE lens element stack supported at the imager via a support structure.

As can be seen with reference to FIG. 2, a camera (such as one of the cameras 14a-d disposed at a vehicle or such as an interior camera disposed at the windshield of the vehicle and viewing forward through the windshield or such as an interior camera disposed in the vehicle with an interior field of view for a driver or cabin monitoring system) has a printed circuit board (PCB) 30 with an imager or imaging device 31 disposed at a surface thereof, and has a lens barrel 32 (supporting a lens having a plurality of lens optics or lens elements 34 therein) supported at a lens holder or support structure 36 that positions the lens barrel and lens relative to the imager 31 and PCB 30.

In the illustrated embodiment of FIG. 2, the lens barrel has an internal shelf or lens element position control 38 that has optical elements or lens elements 34 disposed at opposite sides thereof, with lens spacers 40 disposed between at least some of the adjacent pairs of lens elements 34. A retaining element 42 (such as an adhesive, bezel ring, heat stake or the like) is disposed at the inner end or imager end of the lens barrel to hold or retain the innermost lens element in the lens barrel 32, while an O-ring seal 44 and a lens cap 46 are disposed at the outer end of the lens barrel 32 to hold or retain the lens elements in the lens barrel 32. When the lens barrel 32 is retained at the lens holder (such as after optical alignment and focusing of the lens relative to the imager), the lens barrel 32 is held or retained at the lens holder or support structure 36 (such as via an adhesive) with the position control 38, providing a set or known spacing between the lens and the imager.

The focus distance is impacted by the CTEs of the materials that form the support structure 36 and the lens barrel 32. The lens element stack or lens barrel 32 may have a very low CTE to make the lens substantially temperature invariant or not significantly susceptible to temperature-induced variations. Such a configuration requires the lens barrel material to comprise a low CTE material, which increases costs, yet temperature variations may cause expansion/contraction of the support structure, which may affect the focus length between the lens and the imager.

Figure 3:
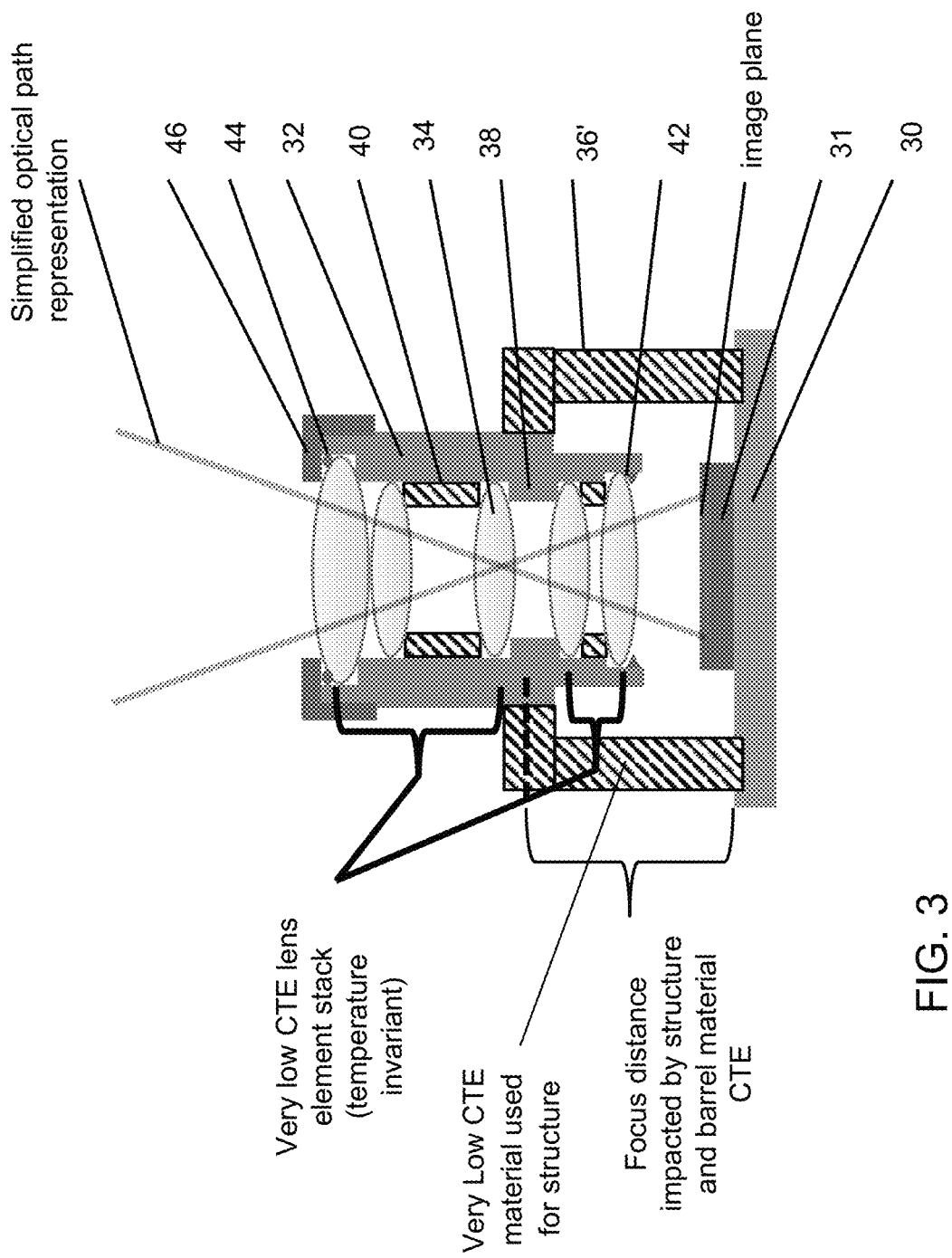
FIG. 3 is a side view diagram of a camera similar to the camera of FIG. 2, with a very low CTE material used for the support structure.

Optionally, and such as shown in FIG. 3, the camera may be substantially similar to the camera of FIG. 2, but with a very low CTE material also used for the lens holder or support structure 36' (and optionally as well as for the lens barrel 32). While such a construction reduces the effects of extreme temperatures, it further increases the costs associated with the camera.

Figure 4:
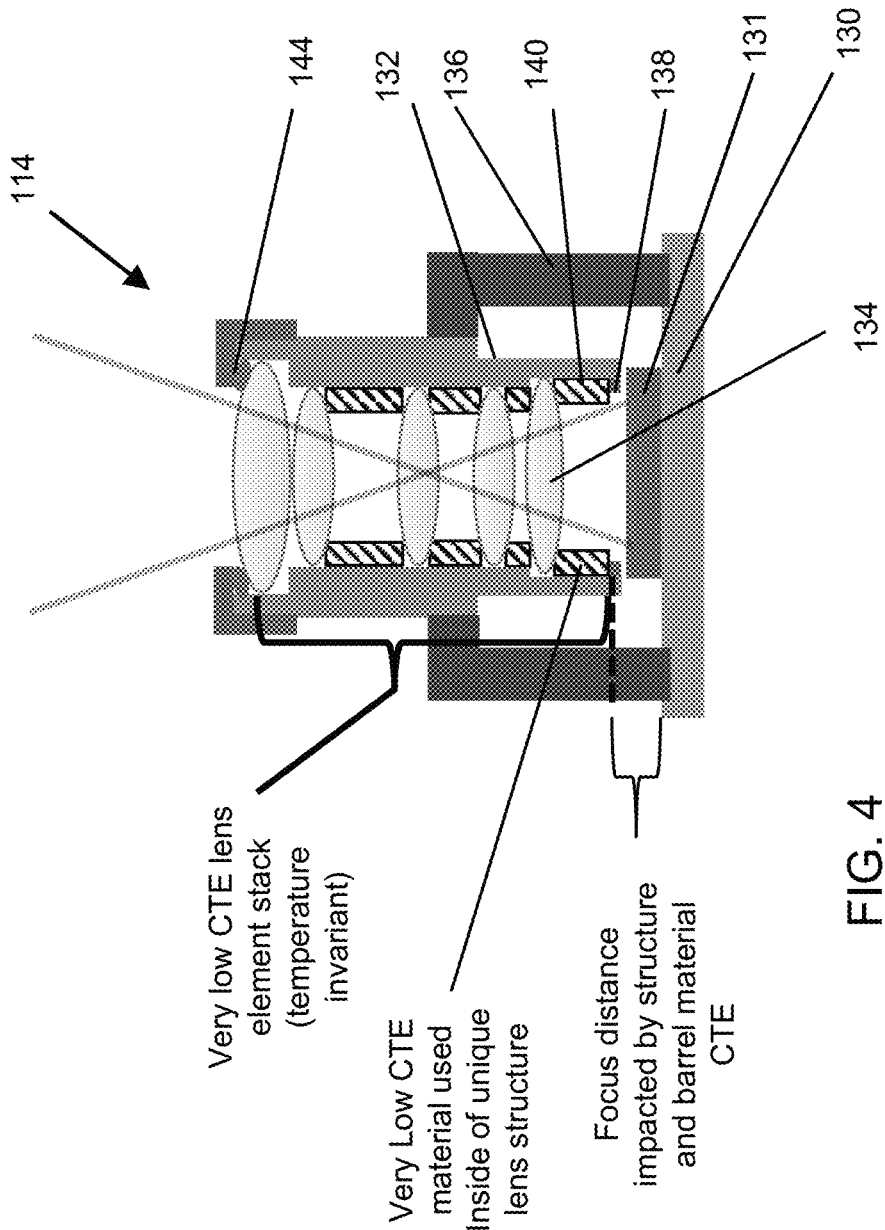
FIG. 4 is a side view diagram of a camera with a lens barrel using very low CTE lens spacers and a lens element position control at the imager end of the lens barrel to reduce or minimize the focus distance that may be impacted by the support structure or lens barrel material CTEs.

Referring now to FIG. 4, a camera 114 has a lens barrel 132 that does not include a centrally located inner shelf or locating portion and instead has very low CTE lens spacers 140 (such as small rings or the like) disposed in the lens barrel and between the lens elements 134 of the lens or lens assembly. The lens barrel 132 is disposed at the support structure or lens holder 136 (and optically aligned and focused at the imager 131 at the circuit board 130), with the inner end or imager end of the lens barrel close to but spaced from the imaging plane of the imager 131. The lens element position control 138 is at the inner end of the lens, which is positioned as close to the imager or sensor as possible, so that the focus distance impacted by the CTE of the support structure or lens holder material and the lens barrel material is substantially reduced. The lens barrel 132 may also include a larger O-ring seal or spring 144 at the outer end of the lens to absorb the effects of the different barrel material CTE (since the lens barrel may expand/contract differently than the very low CTE lens spacers).

The materials that form the lens holder and the lens barrel preferably comprise similar CTEs so that they expand/contract together and cancel out their movement (i.e., so the expansion/contraction of the support structure and lens barrel does not significantly impact the focus of the lens at the imager). The CTE of the lens barrel material and the similar CTE of the lens holder material are matched within 10 percent one to the other, and may be matched within 5 percent one to the other, and may be matched within 3 percent one to the other (and may be formed of the same material or similar materials having the same or almost the same CTE). For example, the lens holder may be formed of a metallic or polymeric material (such as aluminum or ABS or polypropylene or the like) having a CTE of greater than 15 ppm/° C., such as, for example, 20 ppm/° C., and the lens barrel may be formed of a metallic or polymeric material (such as aluminum or ABS or polypropylene or the like) having a CTE of 18 ppm/° C. to 22 ppm/° C. (so as to match the CTE of the lens holder material within 10 percent) or having a CTE of 19 ppm/° C. to 21 ppm/° C. (so as to match the CTE of the lens holder material within 5 percent).

Thus, the camera 114 has a small or limited amount of very low CTE material (to reduce or limit cost), with only the small lens spacers being formed by such material. The very low CTE material is used inside the lens barrel structure, which may not have the centrally located positioning shelf for the lens optics. The lens barrel 132 may have the lens elements loaded into the cylindrical barrel from one end, with the spacers disposed between the elements along the lens barrel (and with the lens optics or elements retained in the lens barrel via the O-ring and cap at one end of the lens barrel and the position control ring or element at the other end of the lens barrel). The lens barrel is positioned at the support structure and optically aligned with and focused at the imager, whereby the lens barrel may be fixed or bonded to the support structure, which has the circuit board attached thereat. Because the CTEs of the material that forms the lens barrel and the lens holder/support structure are the same (or very similar), the lens barrel and lens holder move together and cancel out each other's expansion/contraction (and thus the gap between the lens and the imager has reduced or limited temperature-induced variation). For example, if the lens holder expands to move the lens barrel away from the imager, the lens barrel will similarly expand to move the inner end toward the imager, thereby maintaining or substantially maintaining the desired gap or space between the inner end of the lens and the imaging plane of the imager.

The low CTE of the lens spacer material is less than about 13 ppm/° C., such as is common for many metals such as steel and titanium. This range can also be achieved with some glass filled plastics such as Polyamide-imide (PAI), Polyetherimide (PEI) and PolyEtherEtherKetone (PEEK). However, a material having a low CTE of less than about 10 ppm/° C. is preferred, and preferably a material having a low CTE of less than about 7 ppm/° C. or less than about 5 ppm/° C. is used to form the lens spacers. For example, a material with a low CTE property of less than about 2 ppm/° C. is preferred for forming the lens spacers. An example of such a material is Invar, generically known as FeNi36 or 64FeNi, or a variant of Invar, such as Inovco or Kovar. Because of the small amounts of this material needed to make the lens spacers (which comprise thin rings disposed within the lens barrel and between adjacent lens optics), the incremental cost due to using such materials is minimal.

Optionally, an active internal heating device may be disposed in the camera to actively heat (or cool) the PCB substrate (such as at the side opposite from where the imager is disposed) or to actively heat (or cool) other camera components (such as the lens barrel). The heating device may comprise a thermal electric device (Peltier device) and can be used to either heat or cool the PCB as needed. The active internal cooling of the PCB by way of a thermal electric cooler (TEC) can compensate for temperature-induced variations due to the different CTEs of the materials forming the components so that the different CTEs have less impact so that stability of the PCB and imager relative to the lens is maintained. The thermal electric cooler can also be run in reverse to heat the PCB during cold conditions to maintain stability of the PCB and imager relative to the lens.

The thermal electric cooler or TEC may be operable to heat or cool selected components of the camera to take into account temperature changes and effects on various camera components (and may optionally utilize aspects of the cameras described in U.S. patent application Ser. No. 16/451,179, filed Jun. 25, 2019, which is hereby incorporated herein by reference in its entirety). Optionally, the TEC may be actively controlled to change the focus of the camera regardless of temperature variations and component expansion or contraction due to extreme temperature changes. For example, the TEC may heat or cool the imager circuit board to move the imager relative to the lens to change the gap between the lens and the imager and thus to change or adjust the focus of the lens at the imager, or may heat or cool one or more lens-to-imager positioning elements (that retain the imager PCB relative to the lens to maintain focus of the lens at the imager) to change the gap between the lens and the imager and thus to change or adjust the focus of the lens at the imager.

The TEC thus provides an active focus or controllable focusing device, which may be operable to adjust the focus of the camera responsive to, for example, processing of image data captured by the camera (to bring the images into sharper focus or to adjust focus to enhance focusing of particular elements present in the field of view of the camera or to provide closer focus or more distant focus depending on the particular application or situation). For example, for a backup camera and during a reversing maneuver of the vehicle, the system may adjust focusing of the camera so the camera focuses on closer objects responsive to detection of an object or potential hazard immediately rearward of the vehicle, but may adjust focusing of the camera so the camera focuses on further objects or distances when no such objects or potential hazards are detected (to provide a clearer video display of the region rearward of the vehicle for the driver to view during the reversing maneuver). Optionally, the TEC may provide such an active focus feature responsive to a user input or responsive to temperature sensors or the like at the camera. Optionally, the TEC may function to heat or cool other components of the camera that (when heated/expanded or cooled/contracted) may affect the relative position of the lens and imager and thus may affect the focus of the camera.

Optionally, the coefficient of thermal expansion (CTE) of various components (or strips or elements added to various components) may be selected such that the element(s) that the TEC heats/cools may expand/contract more or less than other components to achieve the desired lens-to-imager adjustment. For example, materials with higher or lower CTEs may be selected for forming components so those components expand/contract more or less when the TEC heats/cools, whereby the components work together to adjust the focus of the camera.

The camera may otherwise comprise any suitable construction for controlling or accommodating temperature-induced changes in the camera (such as changes in focusing of the lens at the imager due to expansion/contraction of the camera components) when the camera is exposed to extreme temperatures, such as below −20 degrees C. or below −40 degrees C. and/or above 60 degrees C. or above 80 degrees C., and may utilize aspects of the cameras described in U.S. Publication Nos. US-2019-0121051; US-2019-0124243 and/or US-2019-0124238, and/or U.S. patent application Ser. No. 16/364,250, filed Mar. 26, 2019, and/or U.S. patent application Ser. No. 16/451,179, filed Jun. 25, 2019, and/or U.S. provisional application Ser. No. 62/866,662, filed Jun. 26, 2019, which are all hereby incorporated herein by reference in their entireties.

The camera module may utilize aspects of the cameras and connectors described in U.S. Pat. Nos. 9,621,769; 9,277,104; 9,077,098; 8,994,878; 8,542,451 and/or 7,965,336, and/or U.S. Publication Nos. US-2009-0244361; US-2013-0242099; US-2014-0373345; US-2015-0124098; US-2015-0222795; US-2015-0327398; US-2016-0243987; US-2016-0268716; US-2016-0286103; US-2016-0037028; US-2017-0054881; US-2017-0133811; US-2017-0201661; US-2017-0280034; US-2017-0295306; US-2017-0302829 and/or US-2018-0098033, which are hereby incorporated herein by reference in their entireties.

The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907;

US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. Pat. No. 9,126,525, which are hereby incorporated herein by reference in their entireties.

Aspects of the camera(s) may be suitable for use on other sensors of the vehicle system, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera for a vehicular vision system, said vehicular camera configured to be disposed at a vehicle so as to have a field of view interior or exterior of the vehicle, said vehicular camera comprising:
   a circuit board having a first side and a second side opposite said first side and separated by a thickness of said circuit board;
   an imager disposed at said first side of said circuit board;
   a lens barrel accommodating a lens assembly having a plurality of lens elements spaced apart one from the other along said lens barrel by respective lens spacers;
   wherein said lens spacers are disposed along and in contact with an inner surface of said lens barrel;
   wherein each of said lens spacers is formed of a material having a coefficient of thermal expansion (CTE) of 10 ppm/° C. or less;
   wherein said lens barrel has an inner end and an outer end;
   wherein said circuit board is positioned at a lens holder, and wherein said lens barrel is positioned at said lens holder so that said lens assembly and said imager are optically aligned;
   wherein, with said lens barrel positioned at said lens holder, said inner end of said lens barrel opposes said imager and is spaced therefrom;
   wherein the lens barrel is formed of a material having a first CTE and said lens holder is formed of a material having a second CTE;
   wherein the first CTE of the material that forms said lens barrel matches within 10 percent the second CTE of the material that forms said lens holder; and
   wherein the first CTE of the material that forms said lens barrel and the second CTE of the material that forms said lens holder are greater than the CTE of the material that forms said lens spacers.

2. The vehicular camera of claim 1, wherein, when said vehicular camera is disposed at the vehicle and exposed to a high or low temperature, expansion or contraction of said lens barrel is offset by a corresponding expansion or contraction of said lens holder so that a gap between said inner end of said lens barrel and said imager is maintained.

3. The vehicular camera of claim 1, wherein the first CTE of the material that forms said lens barrel, the second CTE of the material that forms said lens holder and the CTE of the material that forms said lens spacers cooperate to accommodate temperature-induced variation in focus distance between an innermost lens element and said imager and to maintain focus of images imaged by said lens assembly at said imager.

4. The vehicular camera of claim 1, wherein the material that forms each of said lens spacers has a CTE of 5 ppm/° C. or less.

5. The vehicular camera of claim 1, wherein the material that forms each said lens spacers has a CTE of 2 ppm/° C. or less.

6. The vehicular camera of claim 1, comprising a thermal element selectively operable to actively heat said circuit board and to actively cool said circuit board.

7. The vehicular camera of claim 6, wherein said thermal element operates to change temperature of at least said circuit board to adjust focus of images imaged by said lens assembly at said imager to accommodate temperature-induced variation in focus of images imaged by said lens assembly at said imager.

8. The vehicular camera of claim 1, wherein said lens spacers comprise at least two lens spacers, with one of said at least two lens spacers disposed between lens elements of a first pair of adjacent lens elements and another one of said at least two lens spacers disposed between lens elements of a second pair of adjacent lens elements.

9. The vehicular camera of claim 8, wherein neither of the lens elements of the first pair of adjacent lens elements is part of the second pair of adjacent lens elements.

10. The vehicular camera of claim 8, wherein the first pair of adjacent lens elements is spaced from the second pair of adjacent lens elements by an internal shelf of said lens barrel.

11. The vehicular camera of claim 1, wherein said lens spacers comprise at least three lens spacers, with a first lens spacer of said at least three lens spacers disposed between lens elements of a first pair of adjacent lens elements and a second lens spacer of said at least three lens spacers disposed between lens elements of a second pair of adjacent lens elements, and a third lens spacer of said at least three lens spacers disposed between an innermost one of said lens elements and said inner end of said lens barrel.

12. The vehicular camera of claim 11, wherein a focus distance comprises a distance from said inner end of said lens barrel to an image plane of said imager, and wherein the focus distance is impacted by the first CTE of the material that forms said lens barrel and by the second CTE of the material that forms said lens holder.

13. The vehicular camera of claim 1, wherein the first CTE of the material that forms said lens barrel matches within 5 percent the second CTE of the material that forms said lens holder.

* * * * *